(12) United States Patent
Snyder et al.

(10) Patent No.: US 6,808,462 B2
(45) Date of Patent: Oct. 26, 2004

(54) TRAINING SHOE FOR SOCCER

(75) Inventors: Gregory P. Snyder, 9937 Cavell Ave. South, Bloomington, MN (US) 55438; Matthew R. Ellavsky, Rochester, MN (US); Richard S. Little, Maple Grove, MN (US); Michael Nordquist, Champlin, MN (US)

(73) Assignee: Gregory P. Snyder, Bloomington, MN (US)

( * ) Notice: Subject to any disclaimer, the term of this patent is extended or adjusted under 35 U.S.C. 154(b) by 0 days.

(21) Appl. No.: 10/179,501

(22) Filed: Jun. 25, 2002

(65) Prior Publication Data

US 2002/0198069 A1 Dec. 26, 2002

Related U.S. Application Data

(60) Provisional application No. 60/300,764, filed on Jun. 25, 2001.

(51) Int. Cl.[7] .......................... A63B 69/00; A43B 3/00; A43B 5/00
(52) U.S. Cl. ............................ 473/422; 473/446; 36/1; 36/132
(58) Field of Search ............................... 473/446, 438, 473/444; 36/114, 136, 139, 128, 132, 137, 1; 434/251

(56) References Cited

U.S. PATENT DOCUMENTS

| | | | | |
|---|---|---|---|---|
| 4,204,346 A | * | 5/1980 | Fugere ........................ | 36/114 |
| 4,651,446 A | * | 3/1987 | Yukawa et al. ............... | 36/132 |
| 4,711,043 A | * | 12/1987 | Johnson et al. ............... | 36/139 |
| 5,290,043 A | * | 3/1994 | Vidinic ........................ | 473/446 |
| 5,437,289 A | * | 8/1995 | Liverance et al. .......... | 600/592 |
| 5,471,405 A | * | 11/1995 | Marsh ........................ | 702/41 |
| 5,483,759 A | * | 1/1996 | Silverman ..................... | 36/137 |
| 5,615,111 A | * | 3/1997 | Raskas et al. ................ | 36/136 |
| 5,644,858 A | * | 7/1997 | Bemis ......................... | 36/137 |
| 5,897,446 A | * | 4/1999 | Wiseman et al. ........... | 473/446 |
| 6,315,571 B1 | * | 11/2001 | Lee ............................ | 434/250 |

OTHER PUBLICATIONS

GKM Product Evelopment Inc. Training Aids: Electronic Soccer Pro High Tech Soccer Training AId, No date.*

* cited by examiner

*Primary Examiner*—S. Thomas Hughes
*Assistant Examiner*—Alex F.R.P. Rada, II
(74) *Attorney, Agent, or Firm*—Larkin Hoffman Daly & Lindgren Ltd.; Frederick W. Neibuhr, Esq.

(57) ABSTRACT

A training shoe for soccer includes a pressure-responsive sensor mounted with respect to a soccer shoe at a selected location, for example at the instep or along the laces at the top of the shoe. When a soccer ball is kicked at the selected location, the sensor provides an electrical signal to a microprocessor, causing selection logic in the microprocessor to choose one of several control words. The selected control word is provided to a voice playback circuit to select one of several digital data sets, each set corresponding to a different sound. The playback circuit provides an analog electrical control signal to a speaker, thereby generating a selected sound corresponding to the selected digital data set. System components can be mounted permanently to a shoe, or to a cover or strap arrangement releasably mounted to the shoe.

46 Claims, 7 Drawing Sheets

20-PDIP (300 mil)

Fig.-6

20 SOP

TRAINING SHOE FOR SOCCER

This application claims the benefit of Provisional Application No. 60/300,764 entitled "Training Shoe for Soccer," filed Jun. 25, 2001.

BACKGROUND OF THE INVENTION

This invention relates to apparatus designed to provide instantaneous feedback to athletes in training. More particularly, the invention is directed to a device for generating audible or other sensible responses to certain kicking techniques and approaches used by soccer players.

One of the challenges confronting relatively inexperienced soccer players is the need to develop a proper kicking technique. In general, inexperienced players need to overcome two tendencies. The first is to rely on a favored or stronger foot, typically the right foot, for kicking the ball. The second tendency concerns the point of contact with the soccer ball. Inexperienced players tend to rely exclusively on the toe of the shoe. Coaches and other instructors spend considerable time and effort teaching players to kick more frequently with the "weaker" foot, and to increase their use of more effective contact points for better strength and accuracy, e.g., the top of the foot (typically the lace area) for forward power kicking, the arch or instep for sideways kicking, and as players gain experience, the "outside" part of the foot opposite the arch.

A variety of devices have been proposed for assisting soccer players in developing better kicking techniques. For example, U.S. Pat. No. 5,947,845 (Canelas) and U.S. Pat. No. 3,866,909 (DeSantis) illustrate markers that visually indicate preferred areas of the shoe used for kicking the soccer ball. If desired, the soccer ball also can be marked to indicate preferred areas of contact when kicking.

Training devices have been proposed to provide audible feedback. U.S. Pat. No. 5,433,437 (Dudley) and U.S. Pat. No. 4,711,043 (Johnson et. al) disclose devices mounted on soccer shoes and capable of emitting sounds in response to contact with the soccer ball. The devices can include hollow bulbs with reed whistles, domed cylinders, and resilient molded plastic squeakers. These devices have the advantage of providing instantaneous feedback. If the point of contact between the shoe and soccer ball coincides with the desired location, i.e. where the device is mounted, the pressure from the ball will squeeze the device and produce the sound. If a point of contact is elsewhere, the device does not generate the sound.

Although the instantaneous feedback of the audible devices is beneficial in teaching kicking techniques, the devices protrude outwardly from the shoe, to the extent of detracting from the appearance of the shoe and unduly shifting the point of contact with the ball away from the surface of the shoe. This tends to limit the practical placement of these devices, primarily to the upper foot or lace area as shown in the patents. The devices further are limited in the sense that each device generates a single, characteristic sound. At the same time, the characteristic sound is subject to undesirable inconsistencies arising from the variety of angles and levels of force at which the ball is kicked.

SUMMARY OF THE INVENTION

To overcome these deficiencies, there is provided a training device to promote improved ball handling skills. The device includes a pressure-responsive sensing component positionable along a selected region of a shoe. The sensing component is adapted to generate an electrical sensor signal when subjected to pressure from momentary contact with a ball or other object kicked by an individual wearing the shoe. A signaling component is spaced apart from the selected region of the shoe. The signaling component is operatively coupled to the sensing component and is adapted to generate a sensible signal responsive to the generation of the electrical sensor signal.

Providing separate sensing and signaling components, and operatively coupling these components at least in part with an electrical sensor signal from the sensing component, affords several advantages not found in conventional mechanical audible feed-back devices. One of these is the variety of audio feedback available. Instead of the characteristic sound of a hollow bulb or reed whistle, the training device can generate spoken phrases, simulated crowd noise and musical phrases. At the same time, the audible feedback can be more consistent. For example, a musical phrase can be generated with a consistent tempo and volume, regardless of whether a ball is kicked with different levels of impact or at different angles. The present invention provides devices that are smaller, less obtrusive, more readily built into or otherwise attached to the shoe, and capable of providing a variety of audible responses when contacted by the soccer ball during a kick. The devices have minimal impact on the appearance of the shoe. Further, due to their size and selected positioning on the shoe, the components of the device have minimal impact on performance. The player wearing the shoe is able to kick the soccer ball in the same manner, and with the same result as if that player were wearing an ordinary shoe.

The components of the device afford several options, suited to different teaching objectives. For example, components might be mounted only on the left shoe, with a player whose "weaker" foot is the left foot thereby being encouraged to kick with the left foot more frequently. Several sensors can be mounted on the same shoe if desired, in different selected locations, such as the instep and the lace or top area of the shoe. Typically the components are selected to generate positive or up-beat sounds, e.g., encouraging words or a short musical phrase. However, if desired, a sensor can be placed at yet another selected location on the shoe, e.g., the toe, where the object is to discourage the player from using that location as a point of contact when kicking the ball. In this event, contact preferably simulates a buzzer or other less pleasant sound.

In one preferred version of the invention, the components are built into or otherwise permanently secured to the soccer shoe. In alternative embodiments, straps or closure material (e.g., Velcro) can be used to mount certain components. In either event, players making proper contact when kicking the ball are provided with immediate feedback in the form of the resulting audible signals, and thereby are encouraged to develop sound kicking techniques.

Another aspect of the present invention is an athletic training apparatus. The apparatus includes a pressure-responsive sensing component positionable at a selected sensing location on a shoe. The sensing component is adapted to generate a sensor signal when subjected to pressure from momentary contact with a ball or other object kicked by an individual wearing the shoe. The apparatus includes a signaling component configured to alternatively and individually generate a plurality of different sensible signals. A selecting component is disposed between the sensing component and the signaling component to receive the sensor signal. The signaling component is adapted, in response to receiving the sensor signal, to select one of a plurality of control outputs individually associated with the sensible signals, and to provide the selected control output to the signaling component. This causes the signaling component to generate the sensible signal associated with the selected control component.

In one preferred embodiment, the selecting component comprises a microprocessor having a memory for storing different control words. Each control word is associated with a different one of the control outputs. The microprocessor incorporates selection logic for selecting one of the control words in response to receiving the sensor signal. The selecting component further includes an audio playback circuit coupled to the microprocessor. The playback circuit is adapted to generate the control output associated with the selected control word, and provide the control output to the signaling component.

The apparatus further can include a recording component for storing a further control word to the microprocessor memory, for storing data representing a further control output to the audio playback device, and for associating the further control output with the further control word, whereby the playback device will generate the further control output in response to receiving the further control word. Using this feature, users can load their own, customized sounds into the apparatus for later playback in response to properly executed kicks.

Yet another aspect of the present invention is a training apparatus to teaching kicking techniques. The training apparatus includes a component support structure adapted for removable mounting in a working position with respect to an individual's foot. A pressure-responsive sensing component is carried by the support structure and positioned proximate a selected area of the foot when the support structure is in the working position. The sensing component is adapted to generate a sensor signal when subjected to pressure exceeding a predetermined threshold. A signaling component is carried by the support structure in spaced apart relation to the sensing component. The signaling component is operatively coupled to the sensing component and adapted to generate a sensible signal responsive to the generation of the sensor signal.

Thus in accordance with the present invention, a shoe for soccer or any other sport can be configured to generate a variety of virtually instantaneous feedback signals in response to proper kicking techniques, or improper techniques as well if desired. The sensing components, signaling components and selection components when the selection feature is employed, are small and unobtrusive compared to conventional mechanical audio feedback components. Accordingly the invention provides increased flexibility in locating sensing components. Further flexibility arises from the options of mounting the components permanently to the shoe, or providing a cover or strap arrangement to removably position the components with respect to the shoe. In any event, players are encouraged to increase the use of the "weaker" foot, and employ better kicking techniques.

IN THE DRAWINGS

For a further understanding of the preceding features and advantages, reference is made to the following detailed description and to the drawings, in which.

DETAILED DESCRIPTION OF THE PREFERRED EMBODIMENTS

Figure 1:
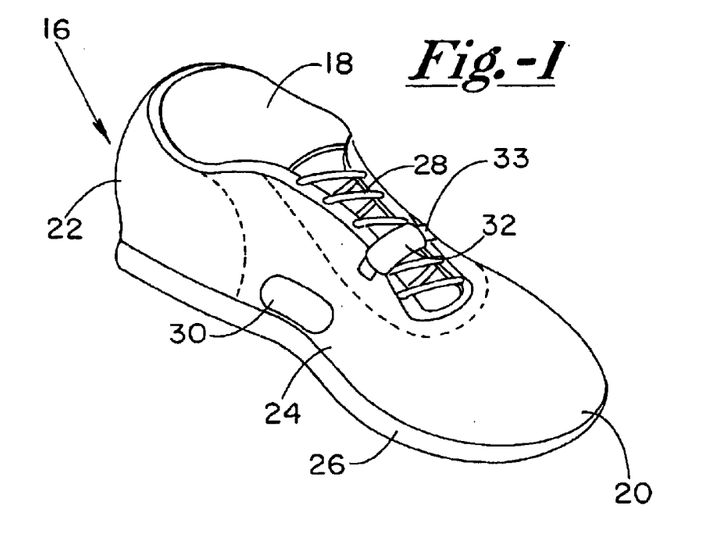
FIG. 1 is a prospective view of a soccer shoe equipped with an audible signal generating device constructed in accordance with the present invention.
Figure 2:
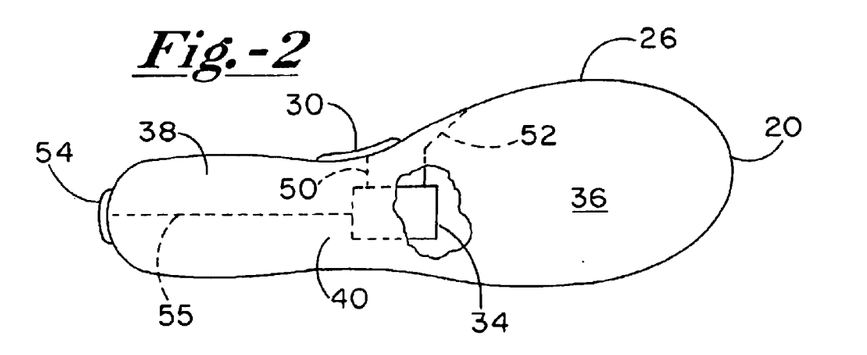
FIG. 2 is a bottom view of the soccer shoe.
Figure 3:
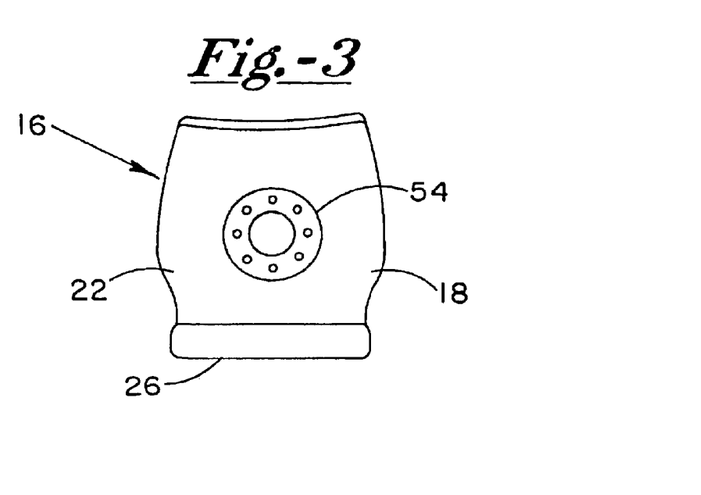
FIG. 3 is an end view of the soccer shoe.

Turning to the drawings, FIGS. 1, 2 and 3 show a soccer shoe 16, specifically the left shoe, equipped with an audible signal generating device in accordance with the present invention. The device can be conveniently thought of as a pressure-responsive audible signal feedback system, with the following components: one or more pressure-responsive sensors; a control circuit receiving signals from each sensor and, in response, generating an output signal; and a speaker receiving the output signal from the control circuit and generating a sound based on that output.

Soccer shoe 16 includes an upper 18 with a toe 20, a heel 22, and an instep 24 positioned along the arch of the player wearing the shoe. The upper is secured to a sole 26 that has a substantial thickness, e.g., one-half inch (13 mm) over the length of the shoe. The sole may include spikes formed along the bottom, although a shoe without spikes is shown in these figures. A portion of the upper has laces, indicated at 28.

Two sensors are mounted to shoe 16: a sensor 30 at the instep or arch area, and a sensor 32 at the top of the shoe over the laced area, mounted to a stretchable strap 33 or other suitable support. Sensors 30 and 32 preferably are flexible membrane switches incorporating thin, flexible polyester or polyamide layers on which thin conductive circuit patterns are formed. The sensors can be shaped as desired, either somewhat elliptical as shown, rectangular, or with another geometric shape. Typically the longest dimension of the sensor is about 3 cm, although the size can vary as desired. The thickness of the sensors is on the order of several millimeters or less. As a result, the sensors do not unduly protrude outwardly from the shoe, and thus do not materially change the shape or profile of the shoe.

Sensors 30 and 32 are configured to respond to pressure that reaches a predetermined minimum or threshold, corresponding to the pressure resulting from contact with the soccer ball during a kick. Pressure that meets or exceeds the threshold closes the membrane switch.

As seen in FIG. 2, the device includes a control circuit 34 embedded into sole 26. The sole includes a forward region 36 corresponding to the ball of the foot, and a heel region 38. The control circuit preferably is embedded into the sole at a medial region 40 between regions 36 and 38, away from the primary weight bearing areas of the sole.

Figure 4:
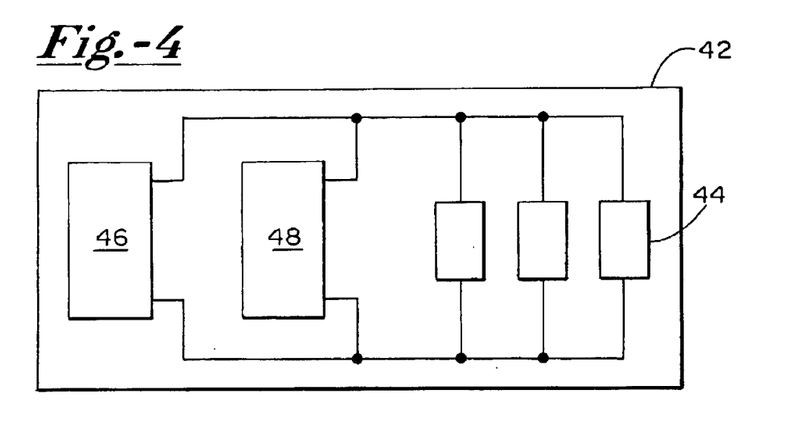
FIG. 4 is a diagrammatic view of a control circuit of the signal generating device.

As seen in FIG. 4, control circuit 34 can be provided in the form of a flexible circuit board 42 including several circuit components, which are electrically coupled to one another by thin film printed circuitry. The components include a power supply 44 consisting of several batteries for providing power at a suitable level, e.g., about 5 volts. The other major components of this circuit include a microprocessor 46 and a voice playback circuit 48.

As indicated by broken lines at 50 and 52 respectively, wires or other electrically conductive paths connect sensors 30 and 32 to the control circuit.

One suitable microprocessor is available from Winbond Electronics Corporation of San Jose, Calif., under the designation "W741E203." The microprocessor can be provided in the form of a dual-in-line package (PDIP) having a length of about 23 mm, a width of about 8 mm, and a thickness of less than 4 mm. Alternatively the microprocessor is provided in the form of an unpackaged die to considerably reduce the size of this component. In either event, the microprocessor operates on a very low current, randomly selecting one of several or multiple addresses in response to receiving the signal generated when one of sensors/switches 30 and 32 is closed. The microprocessor output is a signal uniquely corresponding to the selected address.

Figure 5:
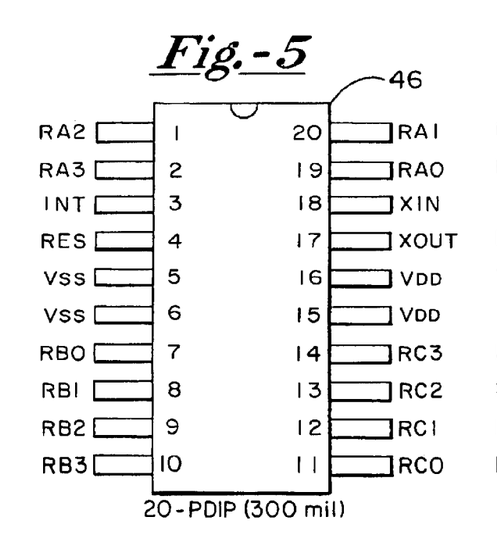
FIG. 5 is a plan view of a microprocessor of the control circuit, in the form of a dual-in-line package.
Figure 6:
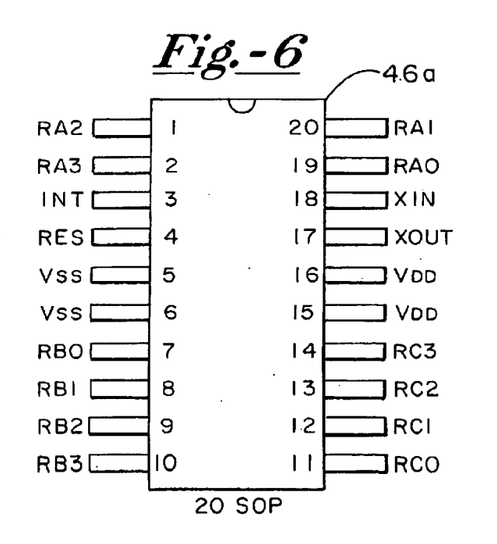
FIG. 6 is a plan view of an alternative microprocessor in the form of a "small outline package;"

FIG. 5 shows microprocessor 46 in the form of a dual-in-line package including a twenty-pin configuration, which presently is preferred. FIG. 6 illustrates an alternative microprocessor 46a in a "small outline package" configuration, again with twenty pins.

Figure 7:
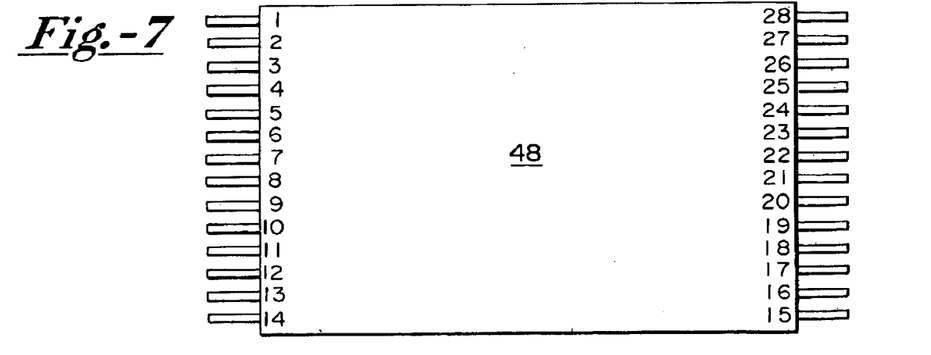
FIG. 7 is a plan view of a voice playback segment of the control circuit in the form of a "thin small outline package;"

A suitable version of voice playback circuit 48 is available from Winbond Electronics Corporation of San Jose, Calif., under the designation "ISD 2560." The playback circuit is provided in the form of a semiconductor chip having a length of about 10 mm, a width of about 5 mm and a 0.5 mm thickness. Alternatively, the playback circuit is provided in the form of a "thin small outline package" (TSOP) of about 13 mm by 8 mm by 1 mm. In either event, playback circuit 48 is readily incorporated into the control circuitry and embedded into sole 26 as shown. FIG. 7 illustrates the TSOP version of playback circuit 48, with 14 pins on each side of the package.

Playback circuit 48 stores several or multiple different sound generating signals, a different signal corresponding to each one of the outputs from microprocessor 46, i.e. each of the addresses.

As seen in FIGS. 2 and 3, a speaker 54 is mounted to heel 22 of the shoe, and electrically coupled to the control circuit, more specifically the voice playback circuit, by an electrical conductor 55 shown as a broken line in FIG. 2. A suitable speaker 54 is available from Panasonic under the designation "EASP3P127A." This speaker weighs 8 grams and has a diameter of about 36 mm, with a thickness ranging from just over 2 mm, to about 4 mm at its center. Speaker 54 generates audible signals in accordance with the electrical signals received from voice playback circuit 48.

Figure 8:
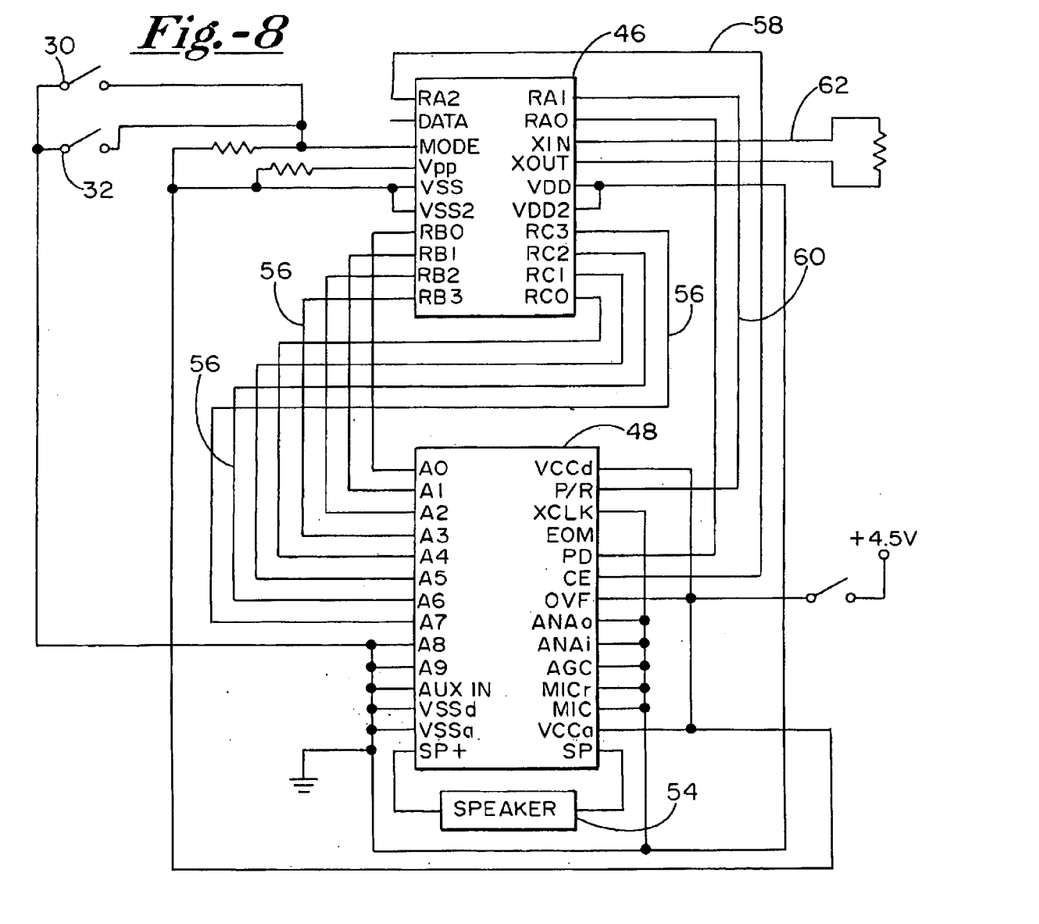
FIG. 8 is an electrical schematic illustrating the major components of the device.

FIG. 8 is an electrical schematic illustrating the coupling of the major components of the device. Sensors 30 and 32, microprocessor 46 and voice playback circuit 48 are coupled between the positive and negative terminals of power supply 44. The positive terminal has a bias of 4.5 volts, and the negative terminal is at ground. Sensors 30 and 32, and any additional sensors that might be provided, are coupled in parallel, so that closure of any one of the membrane switches causes an audible output from speaker 54.

Connections between microprocessor 46 and playback circuit 48 include eight data lines 56 for the parallel transfer of an eight-bit digital control word from the microprocessor to the playback circuit. Specifically, lines 56 are coupled to microprocessor terminals labeled RB0–RB3 and RC0–RC3, and to provide input to terminals A0–A7 of the playback circuit. An enabling input is transferred from a terminal RA2 of the microprocessor to a terminal CE of the playback circuit via a line 58. A playback line 60 couples terminal RA1 of microprocessor 46 with input terminal P/R of playback circuit 48. Line 60 can be used in a recording function, explained in connection with FIG. 17. An external clock 62 is coupled to terminals XIN and XOUT of the microprocessor, for optional use.

Figure 9:
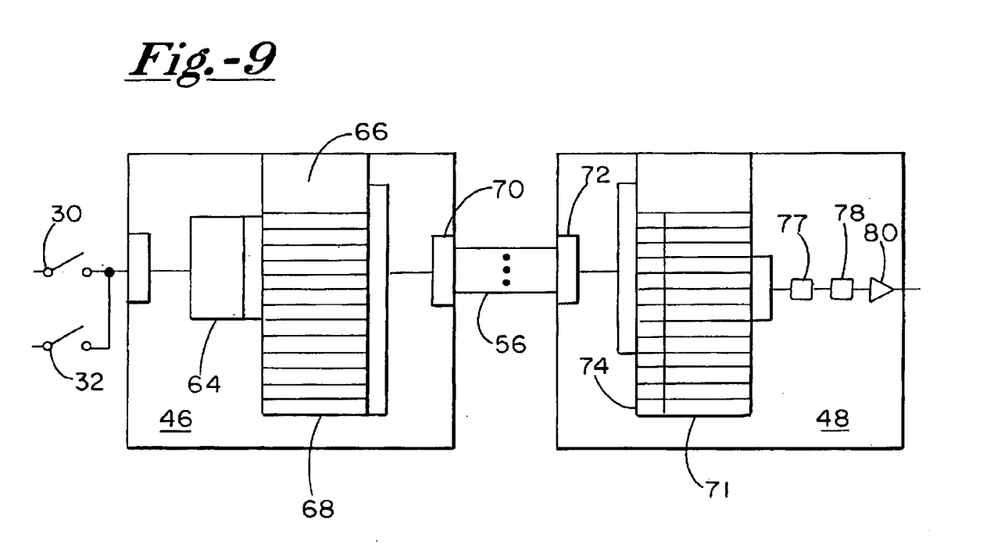
FIG. 9 is a schematic view of the microprocessor and voice playback circuit.

FIG. 9 schematically illustrates certain internal components involved in the interaction of microprocessor 46 and voice playback circuit 48. The microprocessor includes selection logic 64 which can be hardwired, but more preferably is provided as a computer program resident in the microprocessor. A memory 66 of the microprocessor includes multiple registers 68 for storing digital control words, each control word associated with a different one of several desired feedback sounds. The selection logic preferably is configured to operate in a random mode to select control words, but might be configured for an alternative selection mode, e.g. sequential. Each control word is an eight-bit digital word, and resides in one of registers 68. An output register 70 is coupled to the memory, to receive a selected control word for transmission to the voice playback circuit over data lines 56.

Voice playback circuit 48 includes an input register 72 for receiving the control word. The control word is used to select one of multiple addresses 74 associated with digital data representing control outputs. In a preferred version of playback circuit 48, data registers containing the control output data are individually associated with the addresses, which are numbered sequentially. Because the control output data for a given sound selection typically occupies more than one data register, a sequence of the data registers associated with a given sound typically is identified by its initial (lowest numbered) address, and selected on the basis of that address. Accordingly, while using eight-bit control words corresponds to 256 possible addresses, only a fraction of the available addresses (e.g. ten to twenty) actually are used for selection (random or otherwise) from memory 66 of the microprocessor.

In any event, the selection of a particular address selects a sequence of data registers 76 associated with that address. The data in the selected sequence are converted to an analog signal at 77, which is provided to an analog transceiver 78, to a smoothing filter 80 and then to an amplifier 82 of the playback circuit. The output of amplifier 82, i.e. the control output, is an analog electrical signal. The analog signal is provided as an input to speaker 54, which converts the analog electrical control output to the selected sound.

Figure 10:
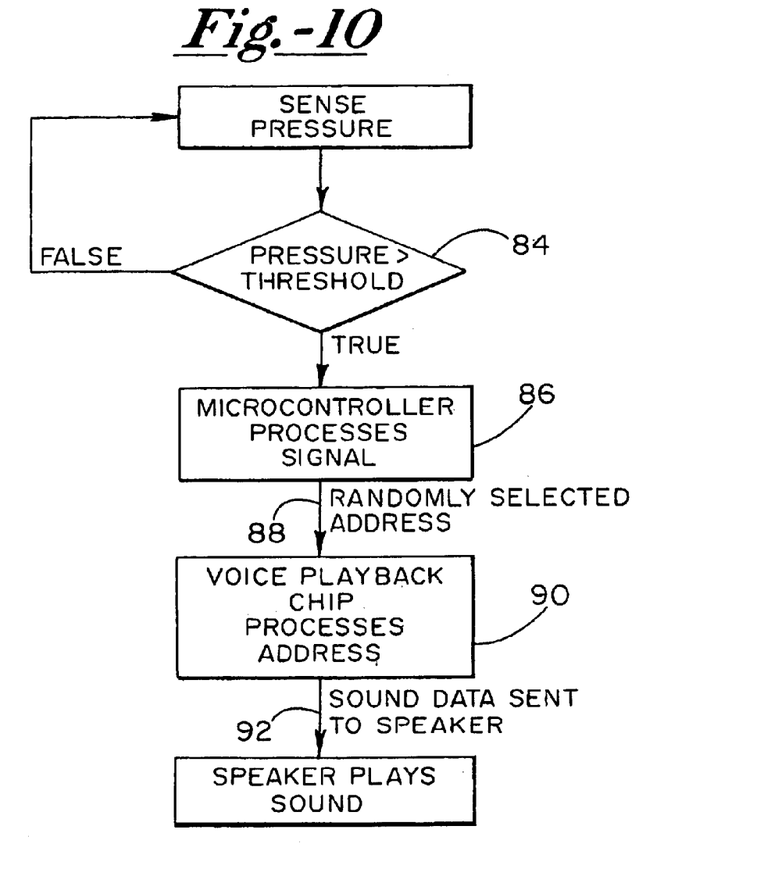
FIG. 10 is a flow chart illustrating operation of the device.

The device functions as illustrated by the flow chart in FIG. 10.

When a kick of the soccer ball results in pressure at one of the membrane switches sufficient to close it, the output of a pressure threshold stage 84 is true. Otherwise the output is false, and no signal is provide to the microprocessor.

Upon receiving a true input, microprocessor 46 at a stage 86 effects a random selection of one of its addresses, generating a signal corresponding to the selected address as indicated at 88. At stage 90, voice playback circuit 48 generates as its output an analog electrical signal corresponding to the selected address. As indicated at 92, the electrical signal is provided as an input to speaker 54, which converts the electrical signal to an audio output to generate the selected sound.

In accordance with the present invention, microprocessor 46 and playback circuit 48 are used in concert to select a wide variety of sounds to be generated by speaker 54 as immediate positive feedback. This informs the player that during the kick, contact with the ball occurred at the desired contact point, or alternatively at one of several desired contact points. Such sounds can include short phrases like "Nice kick!" or "Way to go!", a short musical phrase, or simulated crowd noise, such as cheering or applause. These alternative sounds are randomly selected, but in each instance the intent is to provide positive reinforcement following each correct kick.

Figure 11:
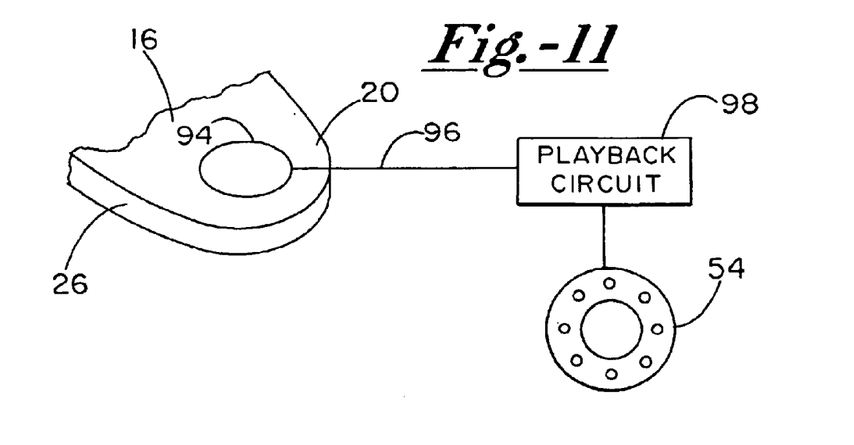
FIG. 11 is a schematic view of an alternative audio feedback device constructed according to the present invention.

According to an alternative embodiment, the device can be used to provide an unpleasant sound as "negative" feedback following an improper kick. As shown schematically in FIG. 11, a sensor 94 in the form of a pressure-responsive membrane switch is mounted to toe 20 of soccer shoe 16. A circuit including sensor 94 incorporates power supply 44. However, microprocessor 46 and playback circuit 48 are not part of the circuit, as indicated by a conductive path 96 coupling the sensor directly to a separate playback circuit 98. The output of playback circuit 98 is an electrical signal to speaker 54, which causes the speaker to generate an unfavorable or negative sound, e.g., simulating a buzzer.

Figure 12:
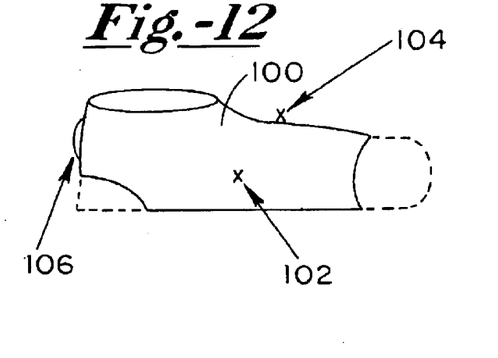
FIGS. 12 and 13 illustrate an alternative embodiment device in the form of a cover.
Figure 13:
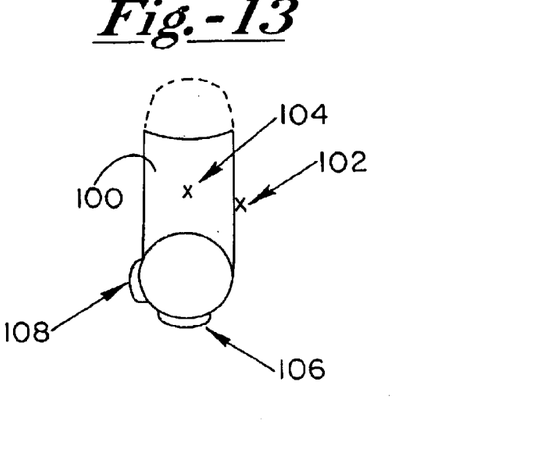

According to another embodiment of the invention shown in FIGS. 12 and 13, a sling or cover 100, resembling a stocking without a toe or heel, is removably secured over the shoe worn by the player. Sling 100 supports all components of the device, eliminating the need to mount any of the components permanently to the shoe and thereby enabling use of the device with a conventional soccer shoe. When the sling or strap is secured, it positions sensors 102 and 104 at desired points of contact for kicking the soccer ball, while at the same time positioning a control circuit 106 and a speaker 108 at points where contact with the soccer ball is comparatively unlikely during normal use. This embodiment is advantageous from the standpoint of avoiding the need to customize or specially configure a particular soccer shoe, and transferability from one soccer shoe to another. On the other hand, components permanently mounted to the soccer shoe, as in the previous embodiments, are fixed with respect to the shoe and thereby prevented from shifting relative to the shoe.

Figure 14:
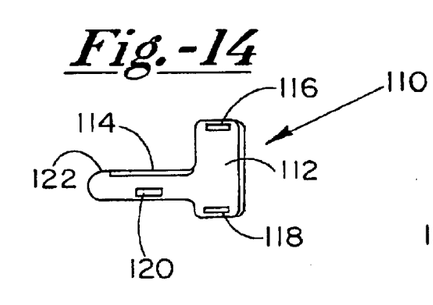
FIG. 14 illustrates a further alternative embodiment device in the form of a strap arrangement.

FIG. 14 illustrates an alternative embodiment device in the form of a strap arrangement 110 including a section 112 forming a forward loop, and a reardly extending horizontal section 114. Section 112 supports a membrane switch or other suitable sensor 116 near the top of the loop, and supports a control circuit 118 near the bottom of the loop. Section 114 of the arrangement supports a membrane switch 120 and a speaker 122.

Figure 15:
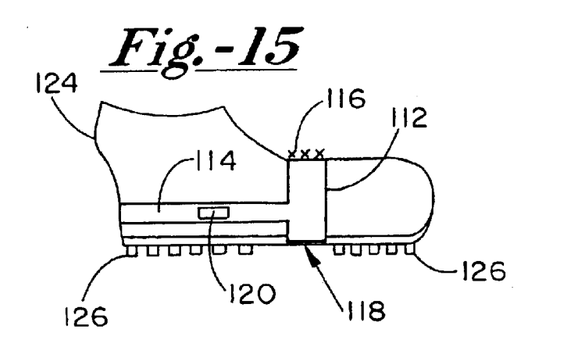
FIG. 15 illustrates the strap arrangement attached to a soccer shoe.

Strap arrangement 110 can be mounted on a soccer shoe 124 having cleats 126 as illustrated in FIG. 15. The loop of section 112 surrounds the shoe along an area between the front and rear cleats, positioning sensor 116 along the top of the shoe and control circuit 118 along the bottom of the shoe between cleats. Meanwhile, horizontal strap section 114 positions switch 120 along the instep, and locates speaker 122 proximate the heel, or in an outstep region near the heel. Strap arrangement 110 can be formed with elastic material, with the loop formed by strap section 112 permanently closed and installed by stretching the strap as it is pulled over the toe of shoe 124.

Figure 16:
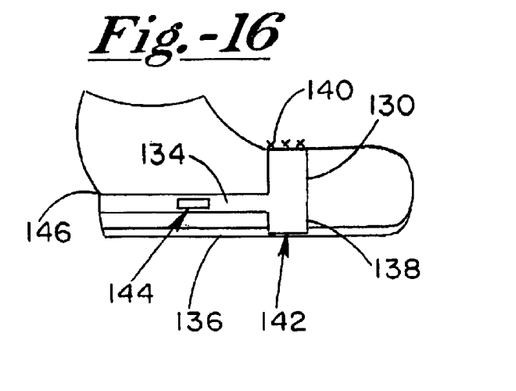
FIG. 16 illustrates the strap arrangement attached to a tennis shoe.

FIG. 16 illustrates an alternative strap arrangement 128 in which a forward strap 130 may or may not be formed of an elastic material, but in any event is not formed as a closed loop. Rather, strap 130 has free ends, typically located on the side of a shoe 132, releasably coupled with one another with closure material to form a closed loop. A horizontal strap 134 can form a reardly extending loop, open at the front, as before. Strap arrangement 128 is particularly well-suited for use with shoes like shoe 132 having a continuous sole 136. To facilitate mounting the strap arrangement, a portion of sole 136 is cut away to provide a tunnel 138, through which strap 130 is threaded by one of its free ends, after which the ends are secured on the outstep side of shoe 132. Thus secured, strap 130 positions a sensor 140 at the top of the shoe, and locates a control circuit 142 within the tunnel. Strap 134 locates a sensor 144 at the instep, and locates a speaker 146 at or near the heel as before.

In the embodiments of FIGS. 12–16 it is advantageous to configure the control circuit, and the conductive paths between the control circuit and the sensors and speaker, as one or more flexible printed circuits.

Figure 17:
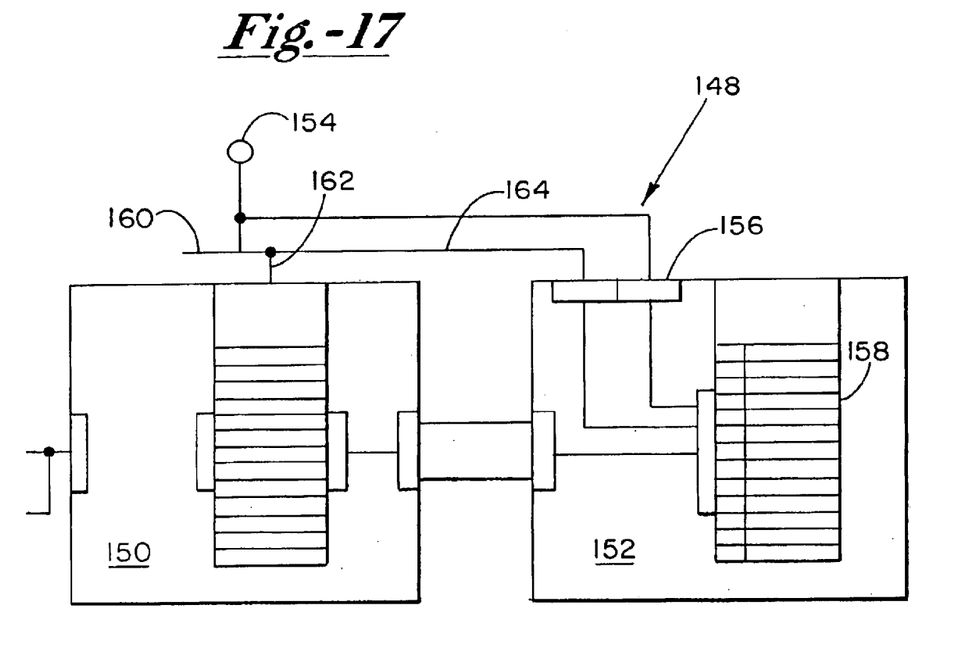
FIG. 17 is a schematic view showing part of an alternative embodiment control circuit incorporating a recording feature.

FIG. 17 illustrates a recording feature of an alternative embodiment control circuit 148, including a microprocessor 150 and a voice playback circuit 152 coupled as previously described. The microprocessor and playback circuit are provided with additional components to enable users to record sounds for future selection and playback. The additional components include a microphone 154 for converting sounds into analog electrical signals. The analog signal corresponding to each input sound is provided from the microphone to a circuit 156 that samples the signal to generate digital data representing the analog electrical signal. The digital data are stored in one or more data registers 158 of playback circuit 152. The microphone is enabled by a control input 160, which also provides an input 162 to microprocessor 150 for storing an address associated with the incoming data, and an input 164 to playback circuit 152 to associate the added address with the added data.

Regardless of the embodiment employed, a soccer player is given immediate feedback which encourages that player to improve his or her kicking technique. The player's interest in improvement is maintained and heightened, due to the variety of sounds provided as positive feedback. The circuit components can be configured and arranged to minimize any impact on the appearance or performance of the shoe.

What is claimed is:

1. A training device to promote improved ball handling skills, including:
   a pressure-responsive sensing component comprising a first sensor positionable near an instep of a shoe and a second sensor positionable along a top of the shoe, each of the sensors being adapted to generate an electrical sensor signal when subjected to pressure from momentary contact with a ball or other object; and
   a signaling component spaced apart from said sensing component, operatively coupled to the sensing component and adapted to generate a sensible signal responsive to the generation of said electrical sensor signal.

2. The device of claim 1 wherein:
   the first and second sensors comprise first and second flexible membrane switches, respectively.

3. The device of claim 1 wherein:
   the first and second sensors are permanently mounted to the shoe.

4. The device of claim 1 wherein:
   the first and second sensors are removably mounted with respect to the shoe.

5. The device of claim 4 further including:
   a component support structure supporting the sensing component and the signaling component, and adapted for a removable mounting to the shoe.

6. The device of claim 5 wherein:
   the support structure comprises a cover adapted to at least substantially surround the shoe.

7. The device of claim 5 wherein:
   the support structure comprises a strap arrangement.

8. The device of claim 1 further including:
   an electrical conductor disposed between the sensing component and the signaling component to conduct the electrical sensor signal from the sensing component toward the signaling component.

9. The device of claim 1 wherein:
   the signaling component comprises a speaker, whereby the sensible signal is audible.

10. The device of claim 9 wherein:
the speaker is mounted proximate a heel of the shoe.

11. The device of claim 1 further including:
a selector operably coupled to the sensing component and adapted, in response to receiving the electrical sensor signal, to select one of a plurality of control outputs individually associated with a plurality of different sensible signals, and to provide the selected control output to the signaling component thereby causing the signaling component to generate the sensible signal associated with the selected control output.

12. The device of claim 11 wherein:
said selector comprises a microprocessor having a memory including a plurality of control words, and selection logic adapted to alternatively select different ones of the control words responsive to receiving the sensor signal; and
an audio playback circuit adapted, responsive to receiving a selected control word, to generate the control output corresponding to the selected control word.

13. The device of claim 12, wherein:
the microprocessor logic includes a random generator to effect random selections of the control words.

14. The device of claim 1 further including:
a playback component adapted to store data representing at least one sensible signal, operatively coupled between the sensing component and the signaling component to provide a control output associated with said data to the signaling component responsive to the generation of the electrical sensor signal; and
a recording component operatively coupled to the playback component for storing said data to the playback component.

15. An athletic training apparatus, including:
a pressure-responsive sensing component positionable at a selected sensing location on a shoe, adapted to generate a sensor signal when subjected to pressure from momentary contact with a ball or other object;
a signaling component configured to alternatively and individually generate a plurality of different sensible signals; and
a selecting component disposed between the sensing component and the signaling component to receive the sensor signal and adapted, in response to receiving the sensor signal, to select one of a plurality of control outputs individually associated with the plurality of different sensible signals, and to provide the selected control output to the signaling component thereby causing the signaling component to generate the sensible signal associated with the selected control output;
wherein the selecting component comprises a microprocessor having a memory for storing different control words, each control word associated with a different one of the control outputs, said microprocessor incorporating selection logic for selecting one of the control words in response to receiving the sensor signal; and
wherein the selecting component further comprises a playback circuit coupled to the microprocessor and adapted to generate the control output associated with the selected control word.

16. The training apparatus of claim 15 wherein:
the sensing component, signaling component and selecting component are fixed to the shoe.

17. The training apparatus of claim 15 wherein:
the sensing component comprises a flexible membrane switch mounted along an instep of the shoe.

18. The training apparatus of claim 15 further including:
electrical conductors electrically coupling the sensing component to the selecting component and coupling the selecting component to the signaling component, wherein the sense signals and the control outputs comprise electrical signals.

19. The training apparatus of claim 15 wherein:
the sensible signals comprise audible signals, and the signaling component comprises a speaker mounted to the shoe.

20. The training apparatus of claim 15 wherein:
said sensing component comprises a first sensor mounted to an instep of the shoe upper, and a second sensor mounted to a top of the shoe.

21. The training apparatus of claim 15 further including:
a recording component for storing a further control word to the memory of the microprocessor, for storing data representing a further control output to the audio playback circuit, and for associating the further control output with the further control word whereby the audio playback circuit generates the further control output responsive to receiving the further control word.

22. The training apparatus of claim 15 wherein:
the selection logic in the microprocessor is configured to randomly select the control words.

23. A training apparatus for teaching kicking techniques, including:
a component support structure adapted for a removable mounting in a working position with respect to an individual's foot;
a pressure-responsive sensing component carried by the support structure, comprising a first sensor located proximate an instep of the foot when the support structure is in the working position, and a second sensor located proximate a top of the foot when the support structure is in the working position, each of the first and second sensors being adapted to generate a sensor signal when subjected to pressure exceeding a predetermined threshold; and
a signaling component carried by the support structure in spaced apart relation to the sensing component, operatively coupled to the sensing component, and adapted to generate a sensible signal responsive to the generation of the sensor signal.

24. The apparatus of claim 23 further including:
an electrically conductive path between the sensing component and the signaling component, wherein the sensor signal comprises an electrical signal.

25. The apparatus of claim 23 wherein:
the signaling component comprises a speaker, wherein the sensible signal comprises an audible signal.

26. The apparatus of claim 23 further including:
a selecting component disposed between the sensing component and the signaling component to receive the sensor signal and adapted, in response to receiving the sensor signal, to select one of a plurality of control outputs, wherein said sensible signal comprises a plurality of different sensible signals individually associated with the control outputs; and
wherein the selecting component further is adapted to provide the selected control output to the signaling component thereby causing the signaling component to generate the sensible signal associated with the selected control output.

27. The apparatus of claim 26 wherein:
the selecting component comprises a microprocessor having a memory for storing different control words, each control word individually associated with one of the control outputs, and selection logic for selecting one of the control words in response to receiving the sensor signal; and audio playback device coupled to the microprocessor and adapted to generate the control output associated with the selected control word.

28. The apparatus of claim 27 wherein:

said selection logic effects random selections of the control words.

29. The apparatus of claim 23 wherein:

the support structure comprises a cover adapted to surround a shoe.

30. The apparatus of claim 23 wherein:

the support structure comprises a strap arrangement.

31. The apparatus of claim 23 wherein:

the support structure comprises a shoe.

32. The apparatus of claim 23 further including:

a playback component adapted to store data representing at least one sensible signal and operatively coupled between the pressure-responsive sensing component and the signaling component to provide a control output associated with said data to the signaling component responsive to the generation of the sensor signal; and a recording component operatively coupled to the playback component for storing said data to the playback component.

33. A training device including:

a pressure-responsive sensing component positionable along a selected region of a shoe and adapted to generate an electrical sensor signal when subjected to pressure from momentary contact with a ball or other object;

a signaling component spaced apart from said selected region of the shoe, adapted to generate different ones of a plurality of sensible signals responsive to receiving different ones of a plurality of control signals individually associated with the sensible signals; and a selector operably coupled to the sensing component, adapted to store a plurality of control words individually associated with the control signals, and further adapted, in response to consecutive episodes of receiving the electrical sensor signal, to alternatively select different ones of the control words according to a selection logic, thereby to select associated ones of the control signals according to said logic, and further to provide the selected control signals to the signaling component thereby causing the signaling component to generate selected ones of the sensible signals according to said selection logic.

34. The device of claim 33 wherein:

said selector comprises a microprocessor having a memory for storing the control words, and incorporating the selection logic; and a playback circuit adapted, to receive the selected control words and to generate the control signals associated with to the selected control words.

35. The device of claim 33 wherein:

the selection logic includes a random generator to effect random selections of the control words.

36. The device of claim 33 further including:

a playback component adapted to store data representing at least one of the sensible signals, operatively coupled between the sensing component and the signaling component to provide a control output associated with said data to the signaling component responsive to the generation of the electrical sensor signal; and a recording component operatively coupled to the playback component for storing said data to the playback component.

37. The device of claim 33 wherein:

the sensing component comprises a flexible membrane switch.

38. The device of claim 33 wherein:

the sensing component is permanently mounted to the shoe.

39. The device of claim 33 wherein:

the sensing component is removably mounted with respect to the shoe.

40. The device of claim 39 further including:

a component support structure supporting the sensing component and the signaling component, and adapted for a removable mounting to the shoe.

41. The device of claim 40 wherein:

the support structure comprises a cover adapted to at least substantially surround the shoe.

42. The device of claim 40 wherein:

the support structure comprises a strap arrangement.

43. The device of claim 33 further including:

an electrical conductor disposed between the sensing component and the signaling component to conduct the electrical sensor signal from the sensing component toward the signaling component.

44. The device of claim 33 wherein:

the signaling component comprises a speaker, whereby the sensible signal is audible.

45. The device of claim 44 wherein:

the speaker is mounted proximate a heel of the shoe.

46. The device of claim 33 wherein:

said sensing component comprises a first sensor positionable near an instep of the shoe and a second sensor positionable along a top of the shoe.

* * * * *